(12) United States Patent
Bourdeaut

(10) Patent No.: US 8,798,908 B2
(45) Date of Patent: Aug. 5, 2014

(54) METHOD OF SUPPORTING LOCATION SERVICES IN A MOBILE RADIO COMMUNICATIONS SYSTEM

(75) Inventor: Stanislas Bourdeaut, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1299 days.

(21) Appl. No.: 11/041,572

(22) Filed: Jan. 25, 2005

(65) Prior Publication Data

US 2005/0182565 A1   Aug. 18, 2005

(30) Foreign Application Priority Data

Jan. 26, 2004 (FR) ...................................... 04 00714

(51) Int. Cl.
*G01C 21/00* (2006.01)

(52) U.S. Cl.
USPC ........... 701/400; 701/469; 701/472; 701/494; 701/505; 701/408; 342/357.42; 342/357.64; 342/357.43; 342/357.46; 342/357.31; 455/456.1; 455/414.2; 340/539.13

(58) Field of Classification Search
CPC ......... G01S 19/05; G01S 19/09; G01S 19/48; H04W 64/00
USPC ......... 701/200, 207, 213, 214, 215, 216, 218, 701/219, 300; 340/988, 989; 455/404.2, 455/414.1, 414.2, 414.3, 414.4, 456.1, 455/456.5, 456.6, 466; 342/357.1, 357.9
See application file for complete search history.

(56) References Cited

U.S. PATENT DOCUMENTS

| | | | | |
|---|---|---|---|---|
| 4,307,455 A * | 12/1981 | Juhasz et al. | ..................... | 714/24 |
| 6,236,359 B1 * | 5/2001 | Watters et al. | ............. | 342/357.1 |
| 6,249,245 B1 * | 6/2001 | Watters et al. | ........... | 342/357.03 |
| 6,266,533 B1 * | 7/2001 | Zadeh et al. | ............... | 455/456.2 |
| 6,295,023 B1 * | 9/2001 | Bloebaum | ............... | 342/357.06 |
| 6,313,787 B1 * | 11/2001 | King et al. | ............... | 342/357.42 |
| 6,429,808 B1 | 8/2002 | King et al. | | |
| 6,516,197 B2 * | 2/2003 | Havinis et al. | ............. | 455/456.1 |
| 6,542,823 B2 * | 4/2003 | Garin et al. | ................... | 701/483 |
| 6,671,377 B1 * | 12/2003 | Havinis et al. | ............... | 380/258 |
| 7,082,311 B2 * | 7/2006 | Hefner et al. | ............. | 455/456.1 |
| 7,116,990 B2 * | 10/2006 | Maanoja | .................... | 455/456.2 |
| 2002/0077126 A1 * | 6/2002 | Pihl et al. | ...................... | 455/456 |
| 2002/0098816 A1 * | 7/2002 | Dooley et al. | .............. | 455/154.1 |
| 2003/0128163 A1 | 7/2003 | Ogino et al. | | |
| 2004/0029583 A1 * | 2/2004 | Yamamoto et al. | ........... | 455/427 |
| 2004/0053628 A1 * | 3/2004 | Beckman | ................... | 455/456.2 |
| 2004/0142702 A1 * | 7/2004 | Hefner et al. | .............. | 455/456.1 |
| 2005/0182565 A1 * | 8/2005 | Bourdeaut | ..................... | 701/213 |
| 2005/0190468 A1 * | 9/2005 | Noguchi | .......................... | 360/1 |

* cited by examiner

*Primary Examiner* — Redhwan k Mawari

(74) *Attorney, Agent, or Firm* — Wolff & Samson, PC

(57) ABSTRACT

A method for supporting location services in a mobile radio communications system, in which method a mobile station receives from at least one network element involved in location services, for the implementation of a position measurement procedure, at least one information element indicating if the method type required for that position measurement procedure is a "Conventional GPS" method type where the mobile station behaves as a conventional satellite positioning system receiver.

5 Claims, 3 Drawing Sheets

METHOD OF SUPPORTING LOCATION SERVICES IN A MOBILE RADIO COMMUNICATIONS SYSTEM

FIELD OF THE INVENTION

The present invention relates generally to mobile radio communications systems.

RELATED ART

Mobile radio communications systems are generally covered by standards and the corresponding standards published by the corresponding standardization organizations may be consulted for a complete description of such systems.

Briefly, a mobile radio communications system comprises a mobile radio communications network communicating with mobile terminals and with external networks. The mobile radio communications network comprises a radio access network (RAN), responsible mainly for transmission and for managing radio resources at the radio interface between the network and the mobile terminals, and a core network (CN), responsible mainly for routing and managing calls.

As shown in FIG. 1, in a system of the Global System for Mobile communications (GSM) type, for example:
- a mobile terminal is called a mobile station (MS),
- the radio access network (RAN) is called the base station subsystem (BSS) and comprises base transceiver stations (BTS) and base station controllers (BSC), and
- the core network (CN) comprises in particular, for circuit switching, mobile switching center (MSC) network elements and, for packet switching, serving GPRS support node (SGSN) network elements.

SUMMARY OF THE INVENTION

The present invention relates more particularly to location services implemented in the above systems to determine the geographical position of mobile station users. The present invention relates more particularly to supporting these location services in the above systems.

DETAILED DESCRIPTION

The following description considers more particularly, by way of example, a system of the GSM type and LoCation Services (LCS) of the type defined in the Technical Specifications TS 03.71 (up to version R99) and TS 43.059 (from version R4) published by the 3GPP (3$^{rd}$ Generation Partnership Project). However, the present invention is not limited to this type of location service and/or to this type of system; in particular, the present invention is equally applicable to the Universal Mobile Telecommunication System (UMTS).

Mechanisms supporting the above services in the above systems are initially described in outline; for a more comprehensive description of these mechanisms, see in particular 3GPP Technical Specifications TS 03.71 and TS 04.31.

The location service support entities provided include in particular a serving mobile location center (SMLC) entity in the radio access network for coordinating the various actions needed to provide location services when a location request is received.

Figure 2:
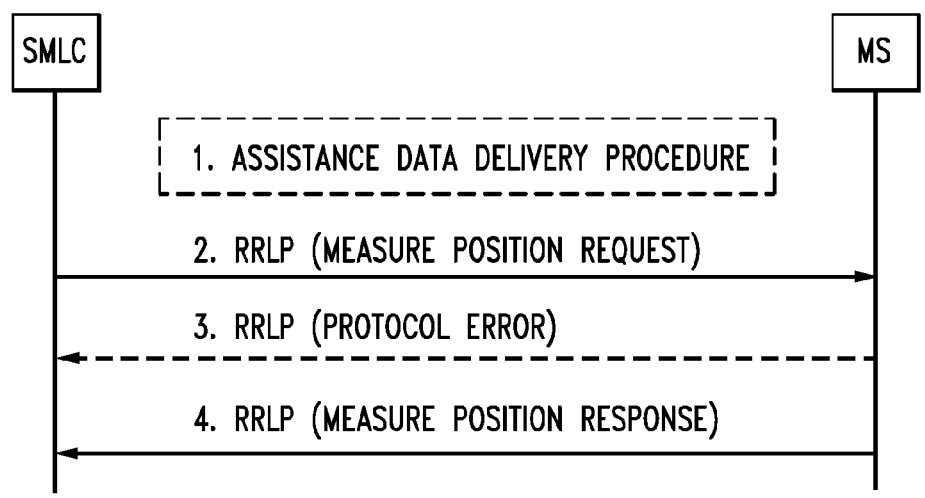
FIG. 2 shows a position measurement procedure, according to aspects of the present invention, for locating a mobile station.

In particular, a position measuring procedure is provided enabling the SMLC to request position measurement data or a position estimate from the mobile station and enabling the mobile station to respond to this request by providing position measurement data or a position estimate. The position measurement procedure includes the exchange of signaling in accordance with the Radio Resource LCS Protocol (RRLP), as shown in FIG. 2, which is taken from 3GPP Technical Specification TS 04.31:
- in a step 2, the SMLC sends the MS a "Measure Position Request" via the BSS,
- in a step 4, the MS sends the SMLC a "Measure Position Response" via the BSS,
- as represented in dashed outline in FIG. 2, the step 2 may be preceded by a step 1 of supplying assistance data to the MS ("Assistance Data Delivery Procedure"),
- as also shown in dashed outline in FIG. 2, in a step 3 the MS may indicate a "Protocol Error" to the SMLC if the request received in the step 2 is incomplete or incomprehensible.

The measure position request sent by the SMLC to the MS in the step 2 contains in particular the position measurement method and the method type that are required; it may also contain assistance data. The measure position response sent by the MS to the SMLC in the step 4 may contain position measurement data or a position estimate, depending on the method type that is required; it may also contain an error indication, in particular to indicate that assistance data is missing or that additional assistance data is needed.

The position measurement method and the method type that are required are selected by the SMLC, in particular as a function of the required quality of service and the position measurement method or methods supported by the MS, as indicated to the network by the MS in an information element (IE), in accordance with 3GPP Technical Specification TS 24.008.

Positioning methods include:
- methods using radio signals transmitted in the cellular mobile radio communications systems themselves, such as, in particular:
  - methods based on the cell identity and the timing advance (TA),
  - methods based on the enhanced observed time difference (E-OTD),
- methods using radio signals transmitted in satellite positioning systems, in particular:
  - methods based on the Global Positioning System (GPS) technology.

Positioning method types include, in particular:
- "MS based" methods in which an estimated position is calculated in the mobile station, possibly with assistance from the network,
- "MS assisted" methods in which an estimated position is calculated in the network, possibly with assistance from the mobile station.

The present invention recognizes in particular that certain problems arise under the current version of the standard, especially in positioning methods based on the GPS technology.

Under the current version of the standard, as represented in particular by the 3GPP Technical Specification TS 04.31, the method type transmitted by the SMLC to the MS in the RRLP measure position request can indicate a method only of the "MS based" type or of the "MS assisted" type.

Now, in the case of the GPS technology, it is also possible to distinguish between:

"conventional GPS" methods in which an estimated position is calculated in the mobile station, which is equipped with a conventional GPS receiver, without the mobile station needing assistance data from the network, and "assisted GPS" methods in which the mobile station needs assistance data from the network, either (in the case of the "MS assisted" method) to be able to carry out position measurements or (in case of the "MS based" method) to be able to effect position measurements and/or to calculate an estimated position.

The current version of the standard does not enable a mobile station receiving a measure position request to determine if the required method type is "Conventional GPS". For example, if it already has assistance data, for example because a location procedure had just been effected for it in a cell supporting the "Assisted GPS" method, a mobile station adapted to support both the "Conventional GPS" method and the "Assisted GPS" method does not know if it should use the "Conventional GPS" method or the "Assisted GPS" method, and in this case it may request unnecessary additional assistance data from the network, which leads to unnecessary additional signaling exchanges that occupy transmission resources unnecessarily and/or introduces unnecessary delays into the location procedure concerned.

Additional problems arise with the current and older versions of the standard.

It should be recalled that, as a general rule, standardized message formats are used over open interfaces such as, in the case of the RRLP in particular, SMLC-BSS interfaces and BSS-MS interfaces. Accordingly, on the basis of the various information elements (IE) to be sent in a message, a sequence of bits to be sent is obtained by following coding rules conforming to a syntax such as that known as the "Abstract Syntax Notation 1" (ASN.1). For more details on the use of this form of coding to transmit RRLP messages, see in particular 3GPP Technical Specification TS 04.031.

With the current or older versions of the standard, it is not possible to modify the standard to introduce new values for coding in accordance with the ASN.1 syntax referred to above the information element corresponding to the method type ("Method Type" IE), as otherwise new equipment conforming to any such modified version of the standard would not be able to interwork with existing equipment conforming to older versions of the standard.

One object of the present invention is to solve some or all of the above problems and/or to avoid some or all of the above drawbacks. A more general object of the present invention is to improve quality of service in relation to supporting location services in mobile radio communications systems.

One aspect of the present invention provides a method for supporting location services in a mobile radio communications system, in which method a mobile station receives from at least one network element involved in location services, for the implementation of a position measurement procedure, at least one information element adapted to indicate if the method type required for that position measurement procedure is a "Conventional GPS" method type, whereby the mobile station behaves like a conventional satellite positioning system receiver.

According to another feature of the invention, the mobile station receives from said network element a measure position request including an information element indicating if the measurement type required for that position measurement is a "Conventional GPS" method type.

According to another feature of the invention, the mobile station receives from said network element a measure position request including an information element indicating that the method type required for that position measurement is the "MS based" method type (meaning the position is calculated by the mobile station) and not containing assistance data.

According to another feature of the invention, when said request is received, a mobile station that has not already received assistance data from the network considers that the measurement type required is the "Conventional GPS" method type.

According to another feature of the invention, when said request is received, a mobile station that has already received assistance data from the network does not request additional data assistance from the network more than N times or for longer than a time T, and if the network has not provided said additional assistance data at the latest after N requests or on the expiry of the time T, the mobile station considers that the required method type is the "Conventional GPS" method type.

The present invention also consists in a mobile station and a network element, such as a SMLC network element in particular, comprising means for implementing a method according to the invention.

In particular, the present invention provides a mobile station comprising means for receiving from a serving mobile location center type mobile radio communications network element, for implementing a position measurement, at least one information element adapted to indicate if the method type required for that position measurement is a "Conventional GPS" method type.

According to another feature of the invention, the mobile station comprises means for receiving from said network element a measure position request including an information element indicating that the method type required for that position measurement is the "MS based" method type and not containing assistance data.

The invention provides in particular a serving mobile location center type mobile radio communications network element comprising means for sending to a mobile station, for implementing a position measurement, at least one information element adapted to indicate if the method type required for that position measurement is a "Conventional GPS" method type.

According to another feature of the invention, the network element comprises means for sending to said mobile station a measure position request including an information element indicating that the method type required for that position measurement is an "MS based" method type and not containing assistance data.

The present invention further consists in a mobile radio communications system comprising at least one such mobile station and/or at least one such network element.

Figure 1:
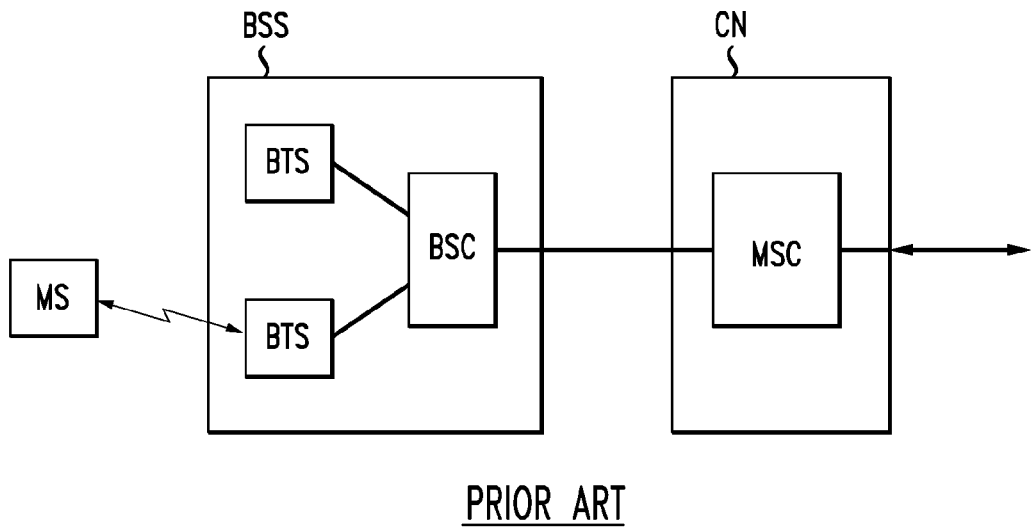
FIG. 1 shows the general architecture of mobile cellular radio communications system, for example a system of the GSM type.
Figure 3:
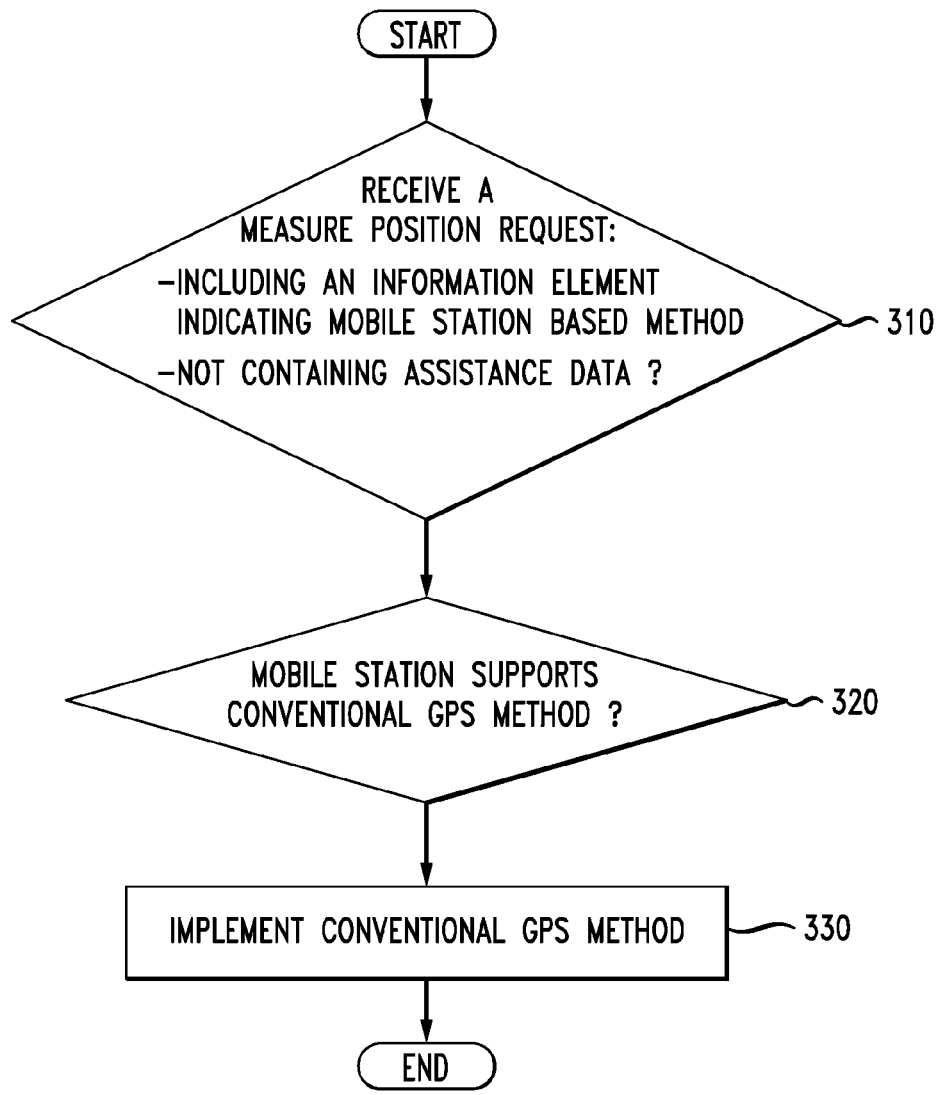
FIG. 3 shows a flow chart of a method for position measurement for locating a mobile station, according to aspects of the invention.
Figure 4:
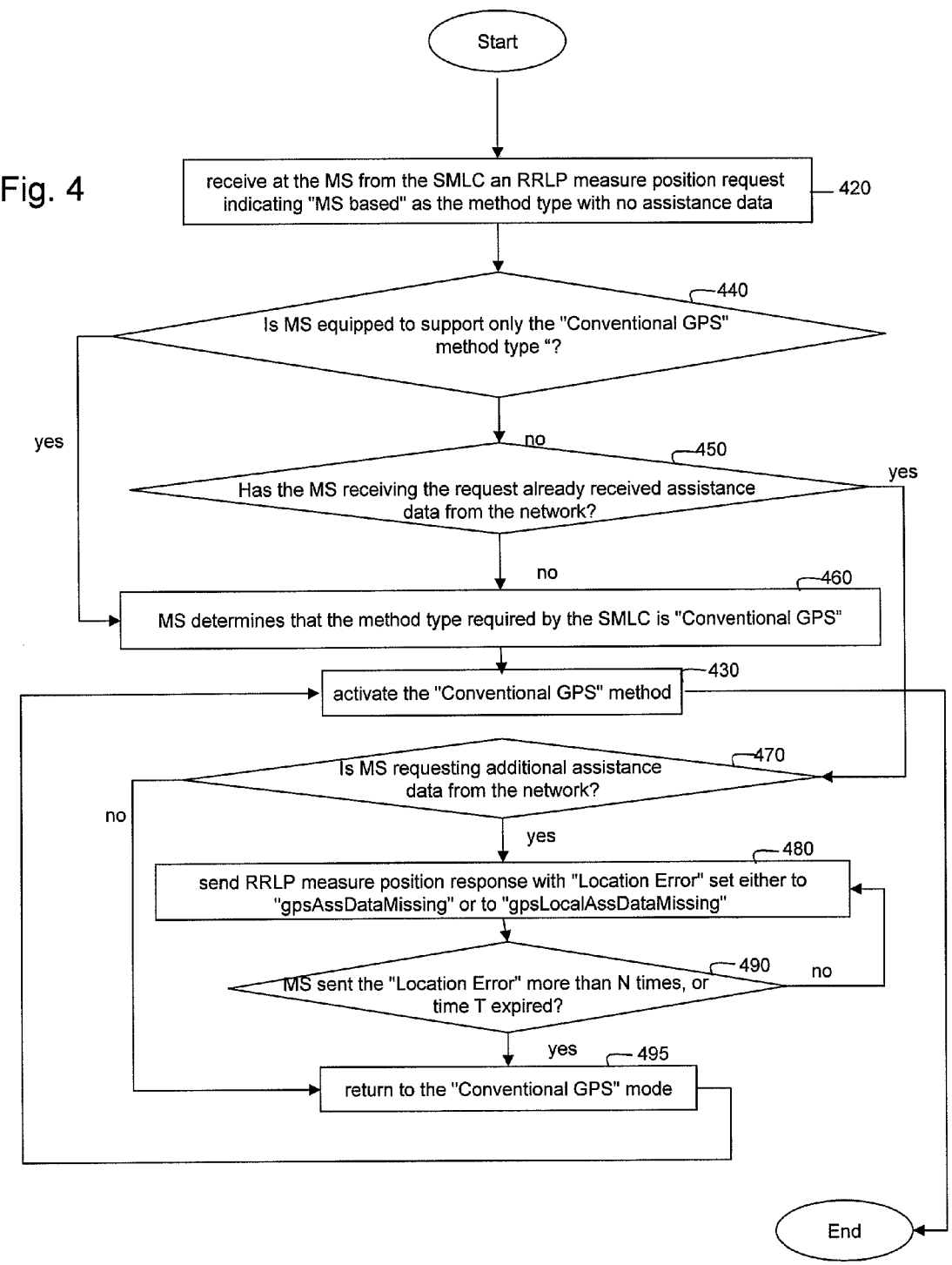
FIG. 4 is another flowchart of a method according to exemplary aspects of the invention.

Other objects and features of the present invention will become apparent on reading the following description of an embodiment of the invention, which description is given with reference to the appended drawings, in which:

FIG. 1 outlines the general architecture of mobile cellular radio communications system, for example a system of the GSM type, and FIG. 2 outlines the main steps of a position measurement procedure for locating a mobile station, for example in the case of LoCation Services (LCS) provided in a system of the GSM type. FIG. 3 is a flow chart of a method according to aspects of the invention. FIG. 4 is another flowchart of a method according to aspects of the invention.

As before, LoCation Services (LCS) as defined in 3GPP Technical Specification TS 03.71 in particular are considered by way of example, more particularly in the context of a system of the GSM type.

In relation to future versions of the standard (versions from version R6 onwards), the present invention suggests introducing new RRLP signaling for requesting a position measurement. The present invention proposes to introduce the "Conventional GPS" method type into the method types that the SMLC may indicate to the MS in an RRLP measure position request. In other words, the present invention suggests providing a new value ("Conventional GPS") for coding the "Method Type" IE, in addition to the "MS based" and "MS assisted" values.

For the current and older versions of the standard, the present invention proposes activating the "Conventional GPS" method (FIG. 4, element 430) by sending from the SMLC to the MS an RRLP measure position request indicating "MS based" as the method type, with no assistance data (FIG. 4, element 420).

The present invention further proposes that, if a request of the above kind is received:

An MS equipped to support only the "Conventional GPS" method type should then consider that the method type required by the SMLC is "Conventional GPS" (FIG. 4, elements 440 and 460).

In the case of an MS equipped to support both the "Conventional GPS" method and the "Assisted GPS" method (FIG. 4, element 440):

if the MS receiving the request has not already received assistance data from the network (FIG. 4, element 450), it should consider that the method type required by the SMLC is "Conventional GPS", (FIG. 4, element 460).

if the MS has already received assistance data from the network (FIG. 4, element 450), and in particular if the MS is already in the "Assisted GPS" mode, the present invention further proposes to take account of the fact that the MS may then request additional assistance data from the network (FIG. 4, element 470) by sending an RRLP measure position response in which the "Location Error" IE is set either to the value "gpsAsspataMissing" or to the value "gpsLocalAsspataMissing" (FIG. 4, element 480). In this case, to allow the location procedure to terminate, the present invention proposes that the mobile station should not remain in the "Assisted GPS" mode for more than a predetermined time T, in other words that the mobile station should not send the "Location Error" IE more than N times (FIG. 4, element 490). If the mobile station has sent the "Location Error" IE more than N times, or if the time T has expired, (FIG. 4, element 490) then it should have returned to the "Conventional GPS" mode (FIG. 4, element 495).

In the example considered, the invention proposes in particular to introduce the following concepts into the current and older versions of the standard (versions R98, R99, R4 and R5):

the invention proposes to introduce into the 3GPP Technical Specification TS 04.31 the concept whereby the "MS based" value of the "Method Type" IE must be taken for "Conventional" or "MS based", the invention proposes to introduce into the 3GPP Technical Specification TS 03.71 the notion whereby, if the SMLC has requested the "Conventional" or "MS based" measurement type in the RRLP measure position request, and if the MS has not already received assistance data from the network, the MS must consider that the SML requires a "Conventional GPS" measurement type, the invention proposes to introduce into the 3GPP Technical Specification TS 03.71 the concept whereby if the SMLC has requested the "Conventional" or "MS based" measurement type in the RRLP measure position request, and if the MS has already received assistance data from the network, the MS should not request additional assistance data from the SMLC more than N times or for longer than a time T (FIG. 4, element 490), and if the SMLC has not supplied the MS with assistance data after at most N requests or before the time T expires, the MS should consider that the SMLC requires a "Conventional GPS" measurement type (FIG. 4, elements 430 and 495). If it has been able to effect its measurements, the mobile may decide to send its measurements before the N requests to the network for additional assistance data or before the time T.

The present invention further consists in a mobile station and a network element (such as an SMLC network element in particular) comprising means for implementing a method according to the invention and a mobile radio communications system comprising at least one such mobile station and/or one such network element.

The particular implementation of such means representing no particular problem for the person skilled in the art, such means do not need to be described here in more detail than by stating their function, as above.

What is claimed is:

1. A mobile station comprising:
a receiver to receive a measure position request from a serving mobile location center mobile radio communications network element, the request containing an information element indicating that one of a mobile station based position measurement method and a mobile station assisted position measurement method is to be used by the mobile station to determine a position of the mobile station,
wherein said mobile station is configured to support both conventional GPS position measurement and assisted GPS based position measurement, said mobile station further configured to use the conventional GPS based position measurement in response to said measure position request if
said information element indicates a mobile station based position measurement method,
said measure position request does not contain assistance data, and
said mobile station has not been provided with additional assistance data after a predetermined number of requests by the mobile station for additional assistance data.

2. The mobile station according to claim 1, wherein the mobile station supports a mobile station assisted method and the conventional GPS method which is activated to calculate the position measurement by the mobile station if the mobile station has not already received the assistance data.

3. The mobile station according to claim 1, wherein the mobile station only supports the conventional GPS method which is activated to calculate the position measurement by the mobile station.

4. The mobile station according to claim 1, wherein:
the mobile station supports the conventional GPS method and a mobile station assisted method, and
the mobile station assisted method is activated to calculate the position measurement by the mobile station when the mobile station has already received the assistance data.

5. The mobile station according to claim 4, wherein the mobile station assisted method is activated and the mobile station requests additional assistance data.

* * * * *